United States Patent [11] 3,633,126

| [72] | Inventors | William S. Martin<br>Schenectady;<br>Joseph P. Chernoch, Scotia, both of N.Y. |
|---|---|---|
| [21] | Appl. No. | 816,906 |
| [22] | Filed | Apr. 17, 1969 |
| [45] | Patented | Jan. 4, 1972 |
| [73] | Assignee | General Electric Company |

[54] MULTIPLE INTERNAL REFLECTION FACE-PUMPED LASER
10 Claims, 8 Drawing Figs.

[52] U.S. Cl. .................................................. 331/94.5, 330/4.3
[51] Int. Cl. .................................................. H01s 3/04, H01s 3/00
[50] Field of Search .......................................... 331/94.5; 330/4.3

[56] References Cited
UNITED STATES PATENTS

| 3,398,379 | 8/1968 | Sims et al. ...................... | 331/94.5 |
| 3,466,569 | 9/1969 | Chernoch ....................... | 331/94.5 |
| 3,493,888 | 2/1970 | Jackson ......................... | 331/94.5 |
| 3,501,241 | 3/1970 | Hansen et al. .................. | 356/244 |

*Primary Examiner*—Ronald L. Wibert
*Assistant Examiner*—F. L. Evans
*Attorneys*—John F. Ahern, Paul A. Frank, Frank L. Neuhauser, Oscar B. Waddell and Louis A. Moucha ABSTRACT: A miniaturized face-pumped, face cooled laser device is described wherein wave front distortion is minimized by the passage of a coherent beam of electromagnetic radiation through an elongated, rectangularly cross-sectioned laser body in an off-axial direction to effect multiple total internal reflections of the beam from fluid cooled, parallelly extending faces of the laser body. Because each ray of the coherent beam passes through substantially identical thermal environments during the reflective transmission of the beam through the laser body, the net distortion of the beam wave front is substantially reduced making the laser device particularly suitable for high-repetition rate, Q-switched operation. In a preferred embodiment, the beam is reflectively passed initially through only a portion of the cross-sectional area of the laser body to effect a first order compensation of beam distortion whereupon the beam is folded back one or more times along adjacent untraversed portions of the laser body for a second order compensation of beam distortion by additional averaging of the optical environment observed by the beam.

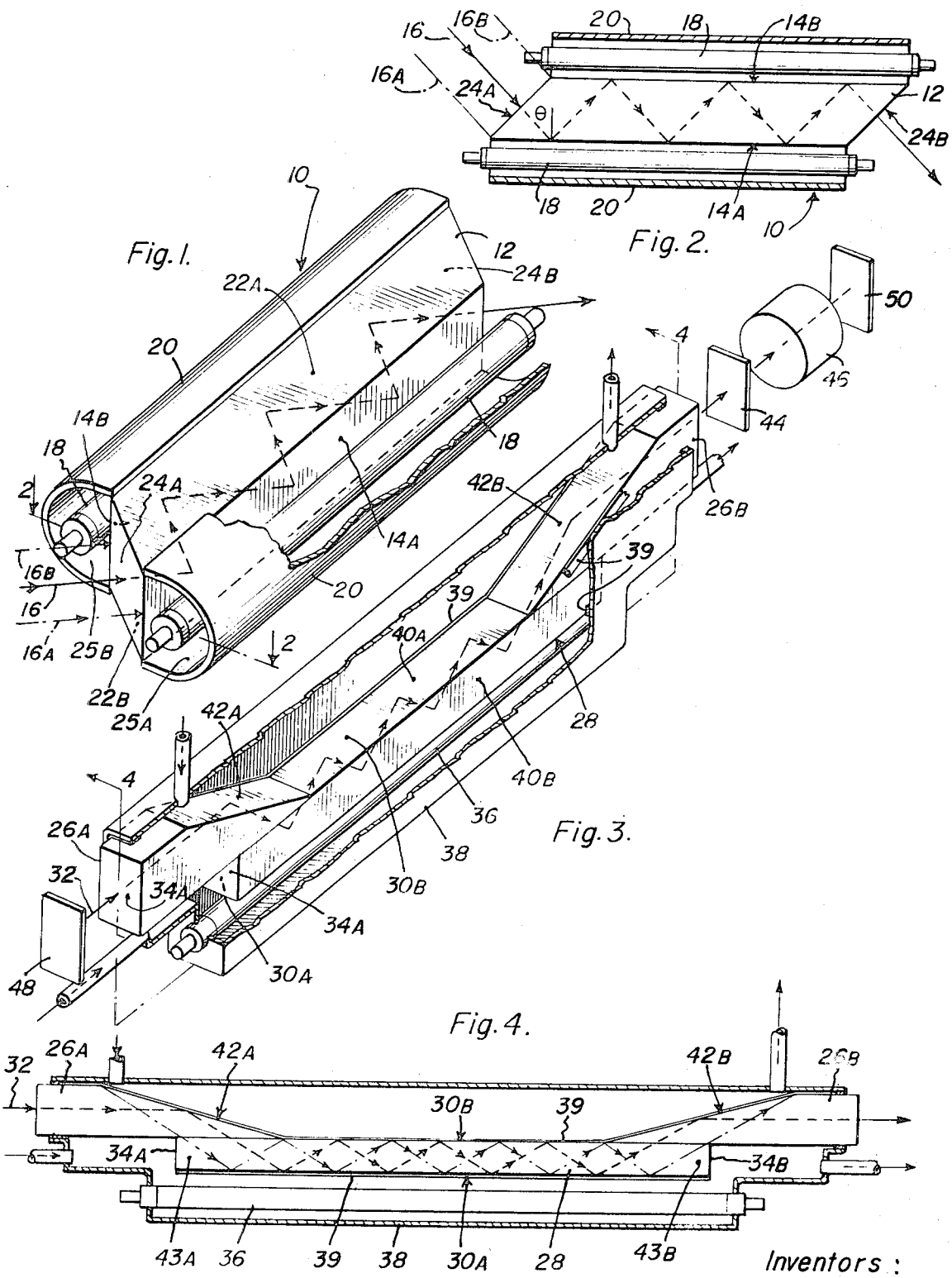

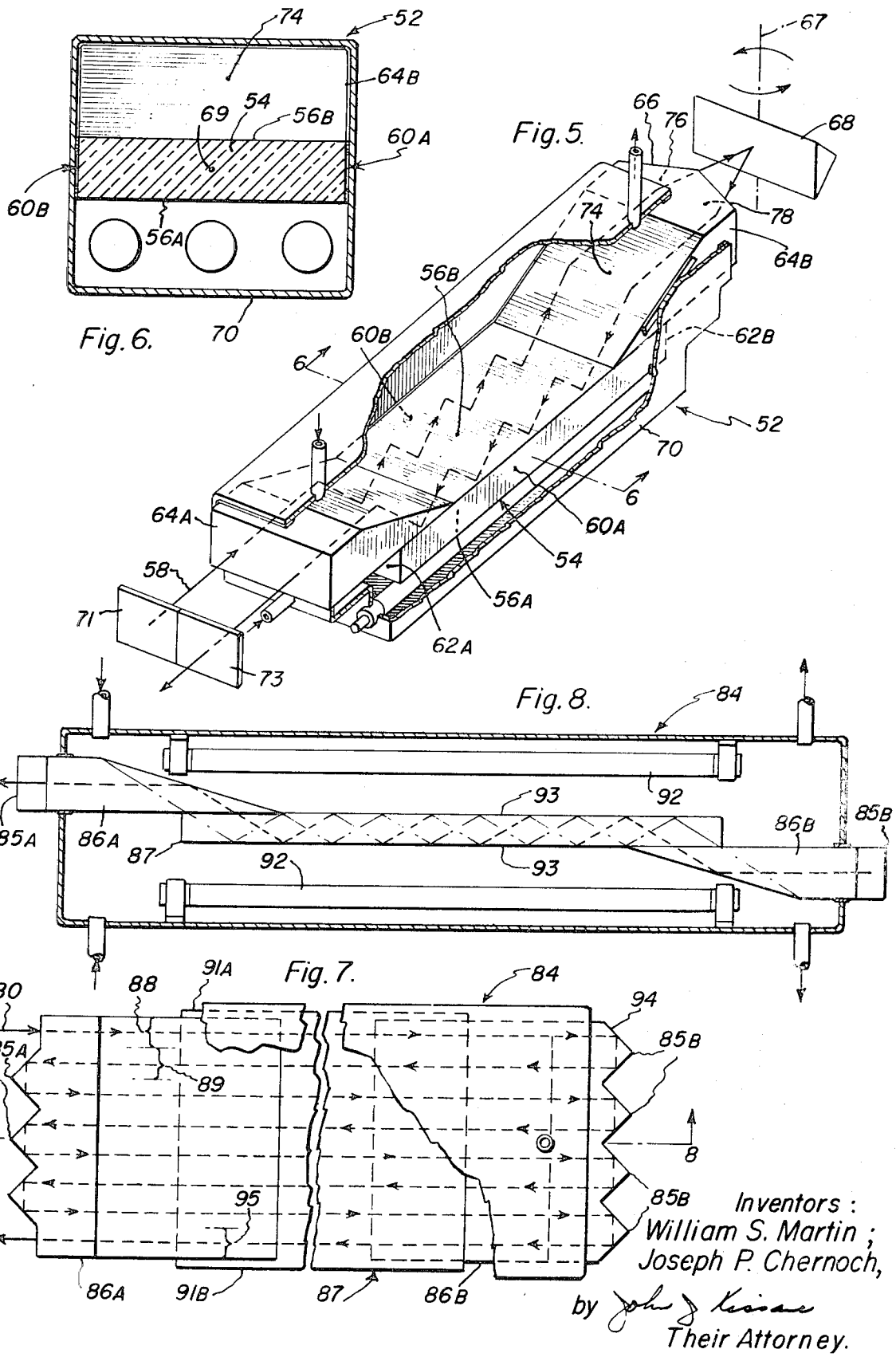

MULTIPLE INTERNAL REFLECTION FACE-PUMPED LASER

This invention relates to a face cooled, face-pumped laser devices and in particular to miniature laser devices wherein the coherent beam of electromagnetic radiation is reflectively transmitted through diversely stressed regions of an active laser body to reduce distortion in the wave front of the beam.

During the operation of laser bodies at high-repetition rates, considerable heat is generated within the laser body in response to optical pumping of the laser body to produce a population inversion therein and artificial means, e.g., passage of a fluid coolant along the laser body surface, generally must be employed to remove the heat from the laser body. Surface cooling of the laser body and the relatively poor thermal conductivity exhibited by most solid laser materials however produce a thermal gradient between the cooled outer surface and the relatively hot center region of the laser body. This results in the center region of the laser body being in compression and the relatively cool surface of the laser body being in tension. Because the index of refraction is a function of both temperature and stress, the wave front of a coherent light beam passing axially through the laser body, i.e. in conventional rod lasers, becomes distorted and the center ray passing through the relatively hot, compressed rod center is delayed relative to rays passing proximate the cool rod exterior. Distortion of the wave front not only substantially reduces the efficiency of rod laser operation but also tends to produce a positive lens effect focusing the beam along the length of the laser body leading to self-destruction of the laser body.

To reduce beam distortion in surface cooled laser bodies, the active laser element heretofore has been sectionalized into a plurality of thin planar sections to permit the passage of a liquid coolant therebetween for heat removal purposes, e.g., as shown in U.S. application Ser. No. 755,652, filed Aug. 27, 1968 in the name of Almasi et al. and assigned to the assignee of the present invention. Sectionalized laser element devices however are relatively bulky because of the necessary span between juxtaposed planar sections and generally require a coolant having an index of refraction approximately equal to the index of refraction of the laser element. Furthermore the efficiency of sectionalized devices is reduced by coherent electromagnetic radiation losses in passage both through the liquid coolant and through the interfaces between the coolant and laser sections.

The stress distribution produced by diverse thermal zones within a laser body at power levels above 1 watt (whereat cooling of the rod becomes an acute problem) also results in a depolarization by stress birefringence in polarized light passing axially through the laser body. Thus operation of the laser body as a Q-switched rod laser employing polarizers and means, such as a Kerr cell, for selectively rotating the field of polarization is severely restricted by the depolarizing effect of the diversely stressed laser body.

It is therefore an object of this invention to provide a light weight, efficient, high-repetition rate laser device.

It is also an object of this invention to provide a low distortion, laser device capable of sustained operation at a high average power output.

It is also an object of this invention to provide a laser device suitable for high-repetition rate switching by an alteration of the plane of polarization of a coherent beam of electromagnetic radiation passing through the active laser element.

It is also an object of this invention to provide an inexpensive laser device capable of generating sustained power outputs in excess of 1 watt.

These and other objects of this invention generally are accomplished in a laser device characterized by an elongated homogeneous body of an active laser medium having at least two optically plane faces extending parallel to the longitudinal axis of the laser body. Pumping means are disposed adjacent at least one of the optically plane faces of the laser body to excite atoms in the laser body to a metastable state and means are provided for passing a fluid coolant across at least one of the optically plane faces to extract heat generated within the laser body thereby producing a thermal gradient between the optically plane faces of the laser body. A beam of coherent electromagnetic radiation then is directed by suitable means through the pumped laser body in an off-axial direction at an angle of incidence relative to the optically plane faces of the laser body to produce a plurality of total internal reflections of the beam by each of said optically plane faces of the laser body. Thus each ray of the beam is multiply reflected from the cool outer surfaces of the laser body through the relatively hot center of the laser body to average the optical environment observed by each ray of the beam thereby minimizing both phase distortion and the effects of stress birefringence in the wavefront of the beam.

The novel features believed characteristic of the invention are set forth in the appended claims. The invention itself, together with further objects and advantages thereof may best be understood by reference to the following description, taken in connection with the accompanying drawings, in which:

FIG. 1 is a partially broken away isometric view of a laser device constructed in accordance with this invention, FIG. 2 is a sectional view taken along lines 2—2 of FIG. 1 to illustrate the path of a coherent beam of electromagnetic radiation within the laser body, FIG. 3 is an isometric view of a laser device particularly suited for liquid cooling the laser body, FIG. 4 is a sectional view taken along lines 4—4 of FIG. 3, FIG. 5 is an isometric view of an alternate laser device constructed in accordance with this invention, FIG. 6 is a sectional view taken along lines 6—6 of FIG. 5, FIG. 7 is a partially broken away plane view of an alternate laser device in accordance with this invention wherein the beam of electromagnetic radiation is multiply traversed through the active laser element, and FIG. 8 is a sectional view taken along lines 8—8 of FIG. 7.

A laser device 10 in accordance with this invention is portrayed in simplified form in FIG. 1 and generally comprises an elongated homogeneous body 12 of an active laser medium, e.g. neodymium doped silicate glass, having two optically plane faces 14A and 14B which faces extend parallel to the longitudinal axis of the laser body to produce a plurality of total internal reflections of a coherent beam of electromagnetic radiation, illustrated by arrows 16, introduced in an off-axial direction into the laser body at an attitude to impinge upon one of the optically plane faces of the laser body. As employed herein, off-axial direction signifies an angular, or non-parallel, disposition of the beam relative to the longitudinal axis of the laser body. Suitable means, such as flash lamps 18 and reflectors 20 are disposed adjacent laser body 12 to isotropically pump faces 14A and 14B thereby producing a population inversion in the body conducive to the stimulated emission of coherent electromagnetic radiation in response to the passage of beam 16 therethrough while heat generated within laser body 12 is removed by forced convectional cooling of faces 14A and 14B with a suitable fluid heat exchange medium, liquid or gas, resulting in a thermal gradient being formed along the laser body interior between faces 14A and 14B. Thus each ray of coherent beam 16 introduced into laser body 12 at an angle of incidence relative to the optically plane faces to produce total internal reflection of the incident radiation therebetween passes through regions of the laser body having diverse thermal contents and therefore diverse indexes of refraction. Distortion of the beam wave front however is compensated by the mixture of optical environments through which each ray passes and the net phase distortion of the wave emitted from laser body 12 is substantially reduced relative to the distortion produced within an axially transmitted coherent beam of electromagnetic radiation.

Laser body 12 can be any nongaseous active laser medium wherein thermal conduction impedes heat removal from the laser body interior sufficiently to form a substantial thermal gradient, e.g., in excess of 40° C., between the convectionally cooled faces and axial center of the laser body during desired operating conditions. Suitably, laser body 12 can be a neodymium doped silicate glass laser body having a rectangular cross section and may be obtained from Owens-Illinois of Toledo, Ohio.

Laser body 12 geometrically is characterized by two substantially parallel extending faces 14A and 14B polished to an optical flatness, e.g., flat to within one-eighth of the wavelength of the coherent radiation emitted by laser body 12, to minimize losses and distortion during reflection of beam 16. The remaining lateral faces 22A and 22B of the laser body need be polished only to optical clarity to produce a total internal reflection of pumping radiation incident thereupon when the laser body is gas cooled while end faces 24A and 24B of laser body 12 desirably are polished to an optical flatness, e.g., within 0.1 microns for neodymium doped silicate glass, to minimize the distortion of the beam passing therethrough. Preferably the end faces, which may be coated with a conventional antireflection coating to maximize efficiency, are cut at an angle of 45° relative to the longitudinal axis to permit the normal incidence thereon of beam 16 disposed at an angle of 45° relative to optically plane face 14A.

Lamps 18 employed to optically pump laser body 12 may be any flash-type lamp emitting optical radiation in a wavelength suitable for the laser medium, e.g., xenon flash lamps provide a pumping wavelength between 5,000 and 9,000 Angstroms suitable for neodymium doped glass. To assure an isometric pumping of optically plane faces 14A and 14B, the radiation emitting portions of lamps 18 extend the entire length of the laser body face proximate the lamp while high-intensity reflectors 20, e.g., of silvered, water cooled copper, shroud the radiation emitting portion of lamps 18 to maximize the intensity of pumping radiation penetrating into the laser body to produce a population inversion therein. Reflectors 20 desirably abut the edges of the laser body and form channels 25A and 25B for the passage of a fluid coolant, e.g., a compressed gas such as air, to convectionally cool laser body 12 only through optically plane faces 14A and 14B respectively.

In the operation of laser device 10 in accordance with this invention, a coherent beam 16 of electromagnetic radiation, e.g., the output from a laser amplifier such as the laser amplifier depicted in FIG. 1, is isotropically impinged upon end face 24A at a normal attitude relative to the plane of the face and the beam passes into laser body 12 to strike optically plane face 14A at an angle of incidence $\theta$ producing a total internal reflection of the incident beam by the face as illustrated in FIG. 2. As is well known, the minimum angle of incidence producing total internal reflection of beam 16 by face 14A is dependent solely upon the indexes of refraction of the media situated on either side of the face and can be determined from the formula $$\theta \text{ critical} = \arcsin \frac{n'}{n}$$

wherein $n$ is the index of refraction of the medium forming laser body 12 and $n'$ is the index of refraction of the coolant flowing across face 14A. For an air cooled glass laser body, an angle of incidence greater than approximately 42° is typically required with an angle of incidence of 45° being preferred to maximize the utilization of the laser body while providing a suitable operating tolerance. Thus, by isotropically applying coherent beam 16 at a normal angle of incidence upon end face 24A, the rays 16A of the beam initially incident at the juncture of faces 14A and 24A are reflected at a 45° angle to traverse a path identical to the traversal path of rays 16B along the opposite edge of the beam initially impinging upon the juncture of faces 24A and 14B. The geometric area of beam 16 and the angle of incidence of the beam upon face 24A therefore assure the passage of the beam through the entire volume of the laser body in a single pass down the laser body thereby maximizing laser device efficiency.

Beam 16 of electromagnetic radiation traverses the length of laser body 12 in an oscillating fashion being multiply reflected between optically plane faces 14A and 14B before emerging from end face 24 in amplified form. Because each ray of the coherent beam passes through regions adjacent faces 14A and 14B of the laser body whereat the fluid coolant maintains the laser body in tension as well as through the relatively hotter compressed midplane region of the laser body, all rays lying within the plane of FIG. 2 pass through substantially identically mixed optical environments and the wave front of the beam is affected uniformly thereby resulting in a first order compensation of the wave front distortion. For example, employing a 15 mm. ×6 mm. rectangularly cross sectioned 150 mm. long neodymium doped silicate glass laser body having two parallel, axially extending, optically plane faces pumped with xenon lamps for operation at pulse repetition rates up to 30 per second with an average power output in excess of 10 watts in the normal pulse mode, a coherent beam of electromagnetic radiation introduced to impinge at a 45° angle relative to the optically plane, air cooled faces exhibits a net distortion reduced by a factor in excess of three relative to the distortion produced in the beam when passed axially through the laser body under identical cooling and pumping conditions.

Because the rays of coherent beam 16 do not appreciably deviate from planes parallelly disposed relative to optically clear faces 22A and 22B, desirably no heat is removed along the optically clear faces to inhibit the formation of a thermal gradient in the laser body along a plane parallel to faces 14A and 14B tending to produce a unidirectional distortion in the wave front of the coherent beam passing therethrough. The optically clear faces of the laser body however do tend to distort somewhat, e.g., become slightly curved, in response to the stresses within the laser body thereby reducing the compensative effect of the off-axial beam passage through the laser body. By spacing the edges of beam 16 from the optically clear faces by a distance approximately 1 to 20 percent of the span between the optically clear faces, distortion produced by faces 22A and 22B is reduced to further increase the compensatory effect of off-axial transmission through the laser body.

When a liquid coolant desirably is employed to remove heat from the optically plane faces of the laser body, a pair of prisms of, for example, clear glass preferably are mounted at opposite ends of the laser body to direct the coherent beam of electromagnetic radiation upon the optically plane faces of the laser body at an angle of incidence in excess of 45°. Such a liquid cooled device is depicted in FIG. 3 wherein laser body 28 is an active laser medium substantially identical to laser body 12 of FIG. 1, e.g., the elongated rectangularly cross-sectioned laser body desirably is formed of a material such as neodymium doped silicate glass and is characterized by two optically plane, artificially cooled lateral faces 30A and 30B for the total internal reflection therebetween of a coherent beam 32 of electromagnetic radiation introduced into the laser body by glass prisms 26A and 26B. Because coherent beam 32 is introduced into laser body 28 by prisms 26A and 26B, end faces 34A and 34B of the laser body need not have an exact geometry or be polished although the end faces portrayed in FIG. 3 are illustrated as being perpendicularly disposed relative to the laser body axis. Pumping energy for laser body 28 is supplied by one or more flash lamps 36, e.g., xenon lamps, confronting face 30A to impinge electromagnetic radiation thereon while a single reflector 38 encompasses both lamps 36 and rod 28 to maximize the pumping energy absorbed by the laser body. If desired, additional pumping energy may be applied to laser body 28 by additional flash lamps (not shown) confronting face 32B. Because reflector 38 overlies lateral faces 40A and 40B of laser body 28, the smoothness required for these faces can be reduced relative to the corresponding faces of the laser body portrayed in FIG. 1 with reflector 38 serving to return emitted pumping radiation to the laser body. Desirably the interior surface of reflector 38 is spaced apart from optically plane faces 30A and 30B to serve as a suitable conduit for the passage of a liquid coolant therethrough while axially extending corner supports 39 function to block the liquid coolant from faces 40A and 40B to inhibit the formation of a thermal gradient within the laser body along a plane normal to those faces. The pumping and cooling of only the surfaces 30A and, or 30B obviously forms thermal gradients within the laser body normal to these surfaces and parallel to the plane of propagation of any one ray of the coherent beam 32 in its passage through laser body 28.

Because the liquid coolant flowing across optically plane faces 30A and 30B increases the critical angle $\theta$ producing total internal reflection of coherent beam 32 relative to gaseous cooled surfaces, e.g., a critical angle of approximately 60° is required for a water cooled surface, beam 32 desirably is introduced and removed from laser body 28 by a pair of prisms 26A and 26B fixedly secured to laser body 28 by an optically contacting adhesive, such as glycerin, for maximum utilization of the laser body. Prisms 26A and 26B have faces 42A and 42B angularly disposed relative to beam 32 to reflect the beam upon optically plane face 30A at an angle of incidence producing a total internal reflection of the beam by the optically plane face while the length of the prism faces are chosen relative to the span between the optically plane faces of laser body 28 to completely irradiate the entire volume of the laser body (excepting triangularly shaped end areas 43A and 43B) in a single traverse of beam 32 through the laser body.

For operation of laser body 28 in an illustrative Q-switched mode, a polarizer 44 and an intermittently energized Kerr cell 46 are disposed within the optical path of beam 32 to control the reflection of the coherent beam between semitransparent mirror 48 and mirror 50 positioned at opposite ends of the laser body. Flash lamp 36 then is energized to pump laser body 28 to a metastable state conducive to the generation of coherent electromagnetic radiation therefrom and coherent electromagnetic radiation rays disposed at a 60° angle of impingence relative to optically plane faces 30A and 30B (for water cooled neodymium doped silicate glass) emerge from the laser body at an angle to be reflected by prism faces 42A and 42B at a normal attitude upon the surfaces of mirrors 48 and 50. Multiple reflections between mirrors however is inhibited by polarizer 44 passing rays of a single polarization and by energized Kerr cell 46 rotating the field of polarization of the polarized rays by 90° for a double pass through the Kerr cell. After laser body 28 has been pumped for a suitable period, for example ½-millisecond, the Kerr cell is deenergized in approximately 0.01 microseconds to permit the return of reflected rays from mirror 50 through laser body 28 stimulating the emission of coherent electromagnetic radiation form the laser body as a pulse of enhanced magnitude. Because coherent beam 32 passing in an off-axial attitude through laser body 28 experiences a plurality of thermal environments, depolarization of the beam by stress birefringence is significantly reduced and the power output of the laser device is maximized.

A further increase in the efficiency of the off-axial laser device can be achieved employing laser device 52 of FIG. 5 wherein the coherent beam of electromagnetic radiation is folded through diverse portions of the laser body to produce a second order compensation in wavefront distortion by reducing the edge effect of the laser body upon the beam. Laser body 54 characteristically possesses two optically plane lateral faces 56A and 56B polished to at least ⅛-wavelength to totally reflect a coherent beam 58 of electromagnetic radiation impinging angularly thereon while the flatness of lateral faces 60A and 60B and end faces 62A and 62B is not critical, e.g. the faces can be rough ground if desired. A pair of prisms 64A and 64B fixedly attached to the laser body with an optically contacting cement, such as glycerine, function to refract coherent beam 58 from a plane parallel to lateral face 56A to a plane disposed at an angle in excess of the critical angle of incidence relative to face 56A while the end face 66 of prism 64B is angularly cut to refract a beam passing therethrough. A reflector, such as Porro prism 68 rotatable about axis 67 for operation of the laser body in a Q-switched mode, is disposed at an attitude relative to the refracting surfaces of end face 66 to intermittently transfer coherent radiation between the surfaces of the end face with each ray of beam 58 being shifted an equal span so that a ray passed through the axial center 69 of laser body 54 is reflected by prism 68 to be returned along lateral surface 60A. Desirably, totally reflective faces 56A and 56B of laser body 54 are cooled by passing a liquid, such as water or a liquid fluorocarbon, through the conduit formed by reflector 70 overlying the cooled faces while juxtaposed, totally reflective and semitransparent mirrors 71 and 73, respectively, function to reflectively transmit coherent electromagnetic radiation through the laser body.

In a Q-switched mode operation, a coherent beam of electromagnetic radiation 58 is reflected by totally reflective mirror 71 and refracted by prism 64A to pass into one-half the rectangular cross section of laser body 54 at an angle to experience a plurality of total internal reflections between optically plane faces 56A and 56B of the laser body thereby inhibiting beam distortion by an averaging of the optical environments experienced by rays in a common plane perpendicularly disposed relative to faces 56A and 56B. The rays of the multiply internally reflected beam which lie in planes proximate the axial center 69 of the laser body, however, encounter an optical environment differing from the optical environment experienced by rays passing the length of laser body 54 proximate face 60B because face 60B becomes slightly curved during laser operation, thereby relieving some stress and changing the stress distribution in adjacent regions of the laser body. Upon a single traversal of the beam down the laser body, the partially distorted beam is passed into prism 64B wherein the beam is initially refracted by face 74 to a horizontal plane before being refracted by surface 76 upon rotating prism 68. Upon rotation of prism 68 to a proper attitude relative to the impinging beam, the beam is reflected by the rotating prism to surface 78 of prism 64B wherein the incident beam is refracted at an angle to pass through the untraversed portion of the laser body with a plurality of reflection between faces 56A and 56B. Desirably each ray of the beam is shifted by rotating prism 68 an equal span along the laser body so that rays initially passing down the laser body adjacent face 60B are returned along the plane containing center axis 69 while rays initially passing down the plane containing center axis 69 are reflected back proximate slightly curved face 60A. Thus a ray slowed during an initial traversal in a plane containing, or proximate to, laser body axis 69 due to the relatively compressed state of the laser body interior experiences a phase shift upon return along a plane adjacent to face 60A tending to compensate the initial wavefront distortion. In general, laser bodies with beam folding to compensate for stress relief at the laser body edges (as illustrated in FIG. 5) are characterized by a wavefront distortion approximately an order of magnitude less than the wavefront distortion of an unfolded beam illustrated in FIG. 3.

Relief from edge distortion of the beam also can be obtained utilizing laser device 84, depicted in FIGS. 7 and 8, wherein the beam of electromagnetic radiation is multiply traversed in an off-axial direction through only the interior portion of the laser body by a plurality of triangular reflective prisms 85A and 85B mounted along the outermost edges of refractive prisms 86A and 86B. The beam of electromagnetic radiation, identified by center ray 80, is admitted to laser body 87 by prism 86A at an angle to produce a plurality of total internal reflections of the beam between optically plane faces 93 in an initial pass down a fractional portion 88 of the laser body whereupon the beam is refracted by prism 86B at the remote end of the laser body to impinge upon reflective face 94 of triangular prism 85B to be returned along a path 89 abutting originally traversed path 88. The beam then is reflected in identical manner between triangular prisms 85A and 85B to completely fill the volume of the laser body lying between the furtherest expanse of prisms 85B. Desirably, the beam is admitted and removed from the laser body along paths spaced apart from the uncooled lateral faces 91A and 91B of the laser body to limit distortion of the beam by the faces while distortion of the beam due to the thermal gradient between cooled, optically plane faces 93 is compensated by the reflective passage of the beam between the faces during each traverse of the laser body. Preferably beam 80 is narrow in width relative to the width of the laser body, e.g., the beam width generally is less than one fifth the laser body width, to permit employment of an essentially square beam while still utilizing a substantial fraction of the laser body volume.

In the operation of laser device 84 as an amplifier, flash lamps 92 are energized to pump fluid cooled lateral faces 93 of the laser body and beam 80 is introduced into the laser body over an area to isotropically impinge upon reflective face 94 of prism 85B. Because the edge of prism 85 B is spaced interiorly of face 91A, the portion 88 of the laser body initially traversed to impinge upon reflective face 94 is spaced apart from face 91A and distortion of the beam due to stress relief at lateral face 91A is diminished. The beam during each traversal through the laser body is multiply reflected by optically plane faces 93 and, after a multitude of traversals through the laser body, the beam is removed from the laser body in amplified form along a path 95 interiorly disposed relative to face 91B to reduce beam distortion by the edge region.

It is to be noted that conventional rod lasers generally are characterized by reflective surfaces, such as mirrored end faces, disposed at a perpendicular attitude along the longitudinal axis of the laser body while the reflective surfaces of laser devices disclosed herein either are acutely disposed relative to the longitudinal axis of the laser body or are situated perpendicular to the longitudinal axis of the laser body at a location outside the longitudinal plane of the laser body.

While the invention has been described with respect to certain embodiments, it will be appreciated that many modifications and changes may be made without departing from the spirit of the invention, e.g., a rotating mirror could be substituted for the rotating prism of FIG. 5 to reflect the incident beam to the untraversed portion of the rod or a trapazoidally shaped prism could be employed in place of mirrors 71 and 73 to permit the selective transmission of coherent electromagnetic radiation therethrough. The invention, although described with reference to a laser amplifier, is also obviously applicable to a laser oscillator.

What we claim as new and desire to secure by Letters Patent of the United States is:

1. A laser device comprising
   an elongated homogeneous body of an active laser medium, said laser body having a longitudinal axis and at least two optically plane faces extending substantially parallel to each other and to said longitudinal axis,
   pumping means for impinging electromagnetic radiation upon at least one of said optically plane faces to excite atoms of said laser body to a metastable state thereby producing a population inversion therein,
   means for passing a fluid coolant across at least one of said optically plane faces to extract generated heat within said laser body, said fluid coolant producing diverse thermal zones in said laser body between said optically plane faces, and
   means for passing coherent electromagnetic radiation through said pumped laser body in an off-axial direction at an angle of incidence relative to said optically plane faces of said laser body sufficient to produce a plurality of total internal reflections by each of said optically plane faces of said laser body, individual rays of said coherent electromagnetic radiation passing through each of said diverse thermal zones in said laser body to average the optical environment traversed by each ray and thereby minimize phase distortion in the wavefront of said coherent electromagnetic radiation produced by said laser body.

2. A laser device according to claim 1 wherein said off-axial coherent electromagnetic radiation is introduced over an area relative to the angle of impingement upon said optically plane faces to irradiate the entire volume of said laser body in a single traverse through said laser body.

3. A laser device according to claim 1 wherein said means for passing coherent electromagnetic radiation through said laser body are reflectors disposed at opposite ends of said laser body and further including means for intermittently interrupting the passage of coherent electromagnetic radiation between said reflectors.

4. A laser device according to claim 3 wherein said means for intermittently interrupting the passage of coherent electromagnetic radiation between said reflectors include means disposed in the optical path of said coherent electromagnetic radiation for polarizing said coherent electromagnetic radiation and means for intermittently rotating the field of polarization of said coherent electromagnetic radiation.

5. A laser device according to claim 1 wherein said fluid coolant is water, and said coherent electromagnetic radiation is introduced into said laser body by a pair of prisms secured to opposite ends of said laser body with an optically contacting cement, said prism having an edge disposition relative to said optically plane faces of said laser body to impinge light thereon at an angle of incidence in excess of 45°.

6. A laser device comprising
   an elongated generally rectangular cross-sectional area homogeneous body of an active laser medium having a longitudinal axis and at least two optically plane faces extending substantially parallel to each other and to said longitudinal axis,
   pumping means incident upon at least one of said optically plane faces to excite atoms of said laser body to a metastable state thereby producing a population inversion within said laser body,
   means for flowing a fluid coolant across said optically plane faces to extract generated heat within said laser body, said fluid coolant producing diverse thermal zones between said optically plane faces of said laser body,
   means for directing coherent electromagnetic radiation in an off-axial direction through said pumped laser body at an angle relative to said optically plane faces to produce a plurality of total internal reflections of said coherent electromagnetic radiation by each of said optically plane faces of said laser body, said coherent electromagnetic radiation passing through an area of said laser body disposed completely on a first side of the central axis of said laser body, and
   reflective means disposed at the end of said laser body to return said coherent electromagnetic radiation through said laser body in an off-axial direction at an angle relative to said optically plane faces to produce a plurality of total internal reflections of said coherent electromagnetic radiation by each of said optically plane faces of said laser body, said reflective means laterally shifting each coherent electromagnetic radiation ray incident thereon by an equal span along said laser body to return said reflected coherent electromagnetic radiation along an area of said laser body disposed completely on a second side of the central axis of said laser body, individual rays of said coherent electromagnetic radiation passing through each of said diverse thermal zones in said laser body to average the optical environment traversed by each ray and thereby minimize phase distortion in the wavefront of said coherent electromagnetic radiation produced by said laser body.

7. A laser device according to claim 6 wherein said reflective means is a rotating prism.

8. A laser device comprising
   an elongated generally rectangular cross-sectional area body of an active laser medium having a longitudinal axis and at least two optically plane faces extending substantially parallel to each other and to said longitudinal axis,
   pumping means incident upon at least one of said optically plane faces to excite atoms of said laser body to a metastable state thereby producing a population inversion within said laser body, means for flowing a fluid coolant across at least one said optically plane face to extract generated heat within said laser body, said fluid coolant producing substantially parallel diverse thermal zones between said optically plane faces of said laser body, means for directing coherent electromagnetic radiation in an off-axial direction through a predetermined fractional area of said pumped laser body at an angle relative to said optically plane faces to produce a plurality of total internal reflections of said coherent electromagnetic radiation by each of said optically plane faces of said laser body, and reflective means disposed along the ends of said laser body to multiply traverse said coherent electromagnetic radiation through adjacent fractional portions of said laser body in an off-axial direction, individual rays of said coherent electromagnetic radiation passing through each of the diverse thermal zones in said laser body to average the optical environment traversed by each ray and thereby minimize phase distortion in the wavefront of said coherent electromagnetic radiation produced by said laser body.

9. A laser device according to claim 8 wherein said reflective means are spaced apart from the nonreflective lateral faces of said laser body to inhibit a coherent electromagnetic radiation traversal of said laser body adjacent said nonreflective lateral faces.

10. A laser device according to claim 8 wherein said reflective means are at least one triangular prism disposed at opposite ends of said laser body.

* * * * *